Figure 1:
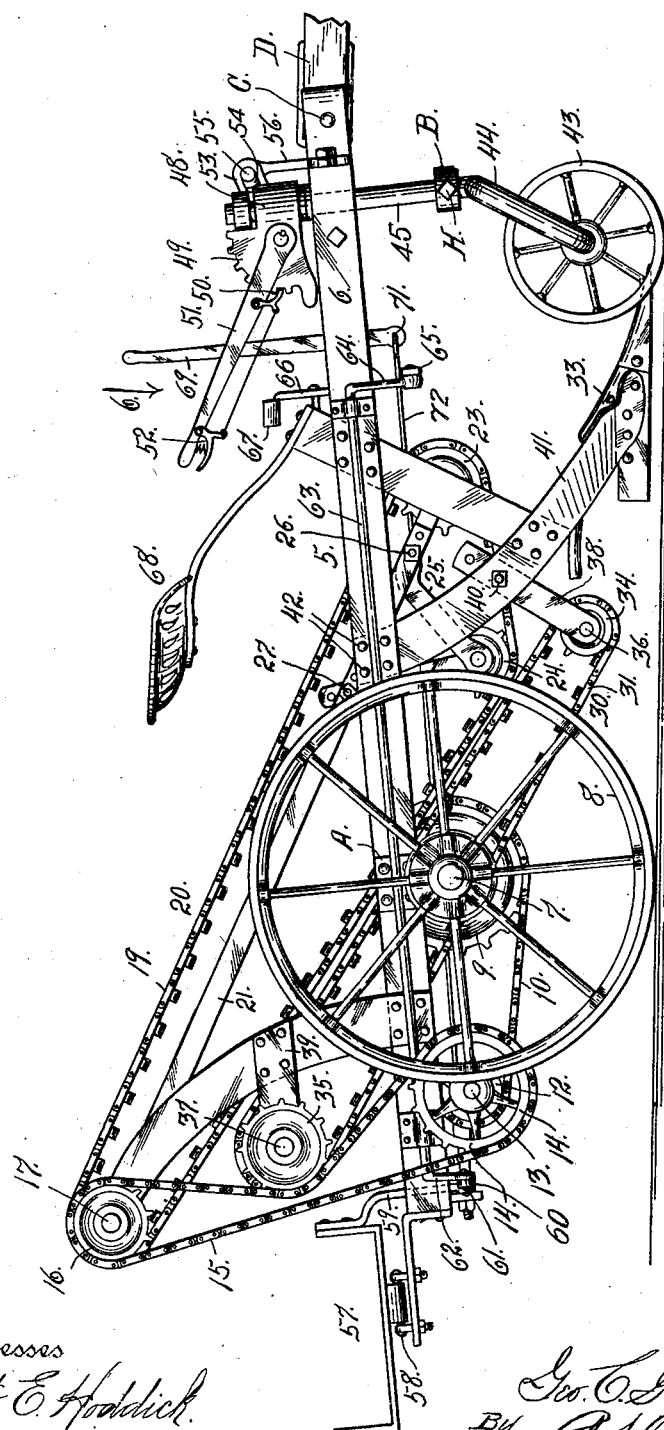

G. C. GETTMAN.
BEET HARVESTER.
APPLICATION FILED DEC. 6, 1909.

990,726.

Patented Apr. 25, 1911.

2 SHEETS—SHEET 1.

Witnesses
Otto E. Hoddick.
J. D. Thornburgh.

Inventor
Geo. C. Gettman.
By A. J. O'Brien.
Attorney

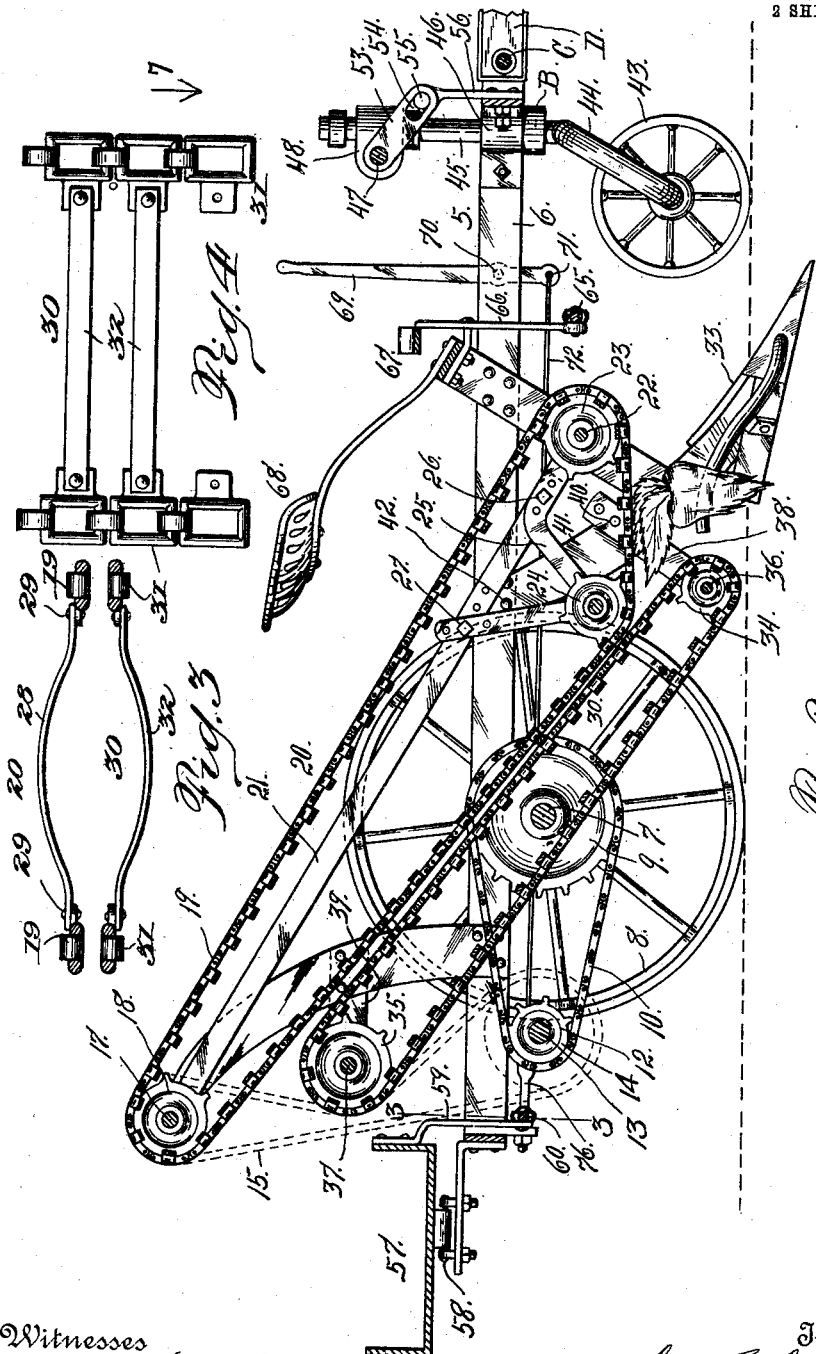

UNITED STATES PATENT OFFICE.

GEORGE C. GETTMAN, OF DENVER, COLORADO.

BEET-HARVESTER.

990,726.　　　　Specification of Letters Patent.　　Patented Apr. 25, 1911.

Application filed December 6, 1909.　Serial No. 531,666.

*To all whom it may concern:*

Be it known that I, GEORGE C. GETTMAN, a citizen of the United States, residing in the city and county of Denver and State of Colorado, have invented certain new and useful Improvements in Beet-Harvesters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in beet harvesters and while it may be employed in connection with the harvesting of other vegetables which grow in a similar manner, it is more especially intended for use in the harvesting of beets and will therefore be so described.

My object is to provide a machine of this character adapted to be advantageously employed for the aforesaid purpose and which is adapted to dig the beets, carry them upwardly and discharge them into a tiltable trough or box from which they may be dumped or discharged at suitable intervals, thus leaving the beets in piles as the machine travels across the field.

The beets after being dug are carried upwardly between two endless chain conveyers, two runs of the two conveyers coöperating with each other to elevate the beets, the two conveyers leaving each other at a suitable elevation to allow the beets to drop into the tiltable trough.

Having briefly outlined my improved construction, I will proceed to describe the same in detail, reference being made to the accompanying drawing, in which is illustrated an embodiment thereof.

In this drawing: Figure 1 is a side elevation of my improved machine, the frame being tilted to throw the diggers above the surface of the ground as when not in use. Fig. 2 is a sectional view, showing the framework in approximately the horizontal position, with the diggers penetrating the earth to the necessary depth for beet-uprooting purposes. Fig. 3 is a cross section taken through the coöperating runs of the endless beet-carrying conveyers. Fig. 4 is a fragmentary top plan view of one of these conveyer runs.

The same reference characters indicate the same parts in all the views.

Let the numeral 5 designate a longitudinally disposed framework having side bars 6, the said bars being fulcrumed on the main axle 7 of the machine which is supported by ground wheels 8. It may be assumed that the ground wheels are fast on the axle and that the latter is equipped with sprocket wheels 9 from which chains 10 pass to sprocket wheels 12 mounted on a shaft 13 suitably journaled on the framework. Also mounted on the shaft 13 is an additional and larger sprocket wheel 14 which is connected by means of a chain 15 with a sprocket 16 fast on a shaft 17 which also carries sprockets 18 engaged by the chains 19 of a conveyer 20 having a frame 21, at the opposite extremities of which shafts 17 and 22 are located; the shaft 22 carrying sprockets 23 located at the lower end of the conveyer. This conveyer also engages idler sprockets 24 mounted on a bracket 25 secured to the conveyer frame 21 by bolts 26 and 27. This bracket is adjustable on the conveyer frame for tension-regulating purposes. The conveyer 20 is composed of 2 chains connected by slightly bowed slats or bars 28, whose extremities are connected with the chains, as shown at 29, (see Fig. 3). The lower run of this conveyer coöperates with the upper run of an endless conveyer 30, composed of two chains 31, connected by correspondingly bowed slats or bars 32. The lower run of one conveyer and the upper run of the other coöperate to carry the beets upwardly with them as they are dug from the ground or uprooted by the plows 33. The chains of the conveyer 30 engage sprocket wheels 34 and 35, located at the lower and upper extremities respectively of the conveyer. These sprockets are fast on shafts 36 and 37, journaled in bearings carried by supporting frame members 38 and 39. The frame members 38 are connected as shown at 40 with depending members 41 secured to the main framework as shown at 42. These members 41 project downwardly and form supports for the plows or diggers 33 which engage the beets of a row on opposite sides for lifting or uprooting purposes.

In Fig. 3 it may be assumed that the two coöperating runs of the endless conveyers 20 and 30 are illustrated. In this view it will be observed that the cross slats or bars 28 and 32 of the two runs are bent or bowed away from each other to form a sort of chamber or traveling chute for the beets during their upward travel.

Located at the forward extremity of the machine are two caster wheels 43, each mounted on a forked frame 44 having an upwardly projecting shank 45, slidable in a bearing 46 carried by the main framework of the machine. A transversely arranged rock-shaft 47 is journaled in bearings 48 carried by the upper extremities of the shanks 45. One of these bearings is equipped with a quadrant 49 toothed to receive a locking pawl 50 carried by an operating lever 51, the pawl being manipulated by a bellcrank lever 52 mounted upon the upper extremity of the device and connected with the pawl 50 in the usual manner. Attached to the rock-shaft is a link 53 which is fast on the shaft at one end and slotted as shown at 54 at the other end to receive a bar 55, which is connected by a hanger 56 with the front of frame 5. By operating the lever 51, the framework 5 may be tilted upon the main axle 7 of the machine, (see Fig. 1).

The rear extremity of the machine is equipped with an open-ended trough 57 centrally pivoted as shown at 58. This trough is provided with a bar 59, through which the pivot passes, the said bar extending downwardly below the trough and being connected with a laterally extending rod 60, which is pivoted at its outer extremity as shown at 61 to a crank arm 62 made fast to a shaft 63 which extends longitudinally of the framework, its forward extremity having a crank arm 64 connected by means of a rod 65 with a depending member 66 whose upper extremity is made fast to a foot plate 67 extending on both sides of the said member. This foot plate 67 is located just in front of the seat 68 and may be tilted in either direction by the driver, for the purpose of dumping the beets out of the trough on either side of the machine, as may be desired.

When the machine is not in use for beet harvesting purposes, it may be thrown out of gear by means of a lever 69, fulcrumed as shown at 70, its lower extremity being connected as shown at 71 with the forward extremity of a rod 72 whose rear extremity is connected with suitable means for releasing the sprocket wheel 12 which communicates motion to the endless traveling conveyers, so that it will rotate loosely on the shaft 13, whereby the connection between the ground wheels and the conveyers is broken, and the machine is therefore out of gear and may be transferred from place to place by simply tilting the main framework 5, whereby the plows or diggers are raised above the ground, as shown in Fig. 1.

As shown in the drawing, the frame bars 6 are provided with depending bearings A in which the axle 7 is journaled. By virtue of this construction the main framework 5 is tiltable or movable on the axle as a fulcrum (see Fig. 1).

From the foregoing description, the use and operation of my improved beet harvester will be readily understood. Assuming that the mechanism is adjusted, as illustrated in Fig. 2 of the drawing, whereby the plows 33 enter the ground to the required depth (the dotted line in said figure indicating the ground level), these plows will be located on opposite sides of a row of beets and so arranged that as the machine moves forward the beets are uprooted and fed to the endless conveyers 20 and 30, the lower runs of the conveyer 20 and the upper run of the conveyer 30 coöperating to form a traveling chute, whereby the beets are carried upwardly and discharged into the tiltable trough or box 57. As soon as a suitable quantity of beets has accumulated in this box, the driver presses his foot upon one side of the plate 67, whereby the latter is tilted in the one direction or the other. By virtue of this construction it becomes practicable to dump the beets into piles of any desired size, as the machine is traveling across the field. When it is desired to transport the machine from place to place, the lever 69 is operated and by virtue of the connecting rod 72, the sprocket wheel 12 is released so it will rotate on the shaft 13, thus throwing the machine out of gear, whereby it may be drawn along without operating the conveyers. At the same time the lever 51 is adjusted to tilt the main frame 5, whereby the plows are lifted from the ground (see Fig. 1).

Attention is called to the fact that the frame of the conveyer 20 is arranged to oscillate upon the shaft 17 as a center, whereby the lower run of the conveyer is formed to move away from the coöperating run of the conveyer 30, to accommodate beets of the largest size. By virtue of this construction the conveyer adjusts itself automatically for beets of all sizes as they are fed to the beet carrying runs from the uprooting mechanism.

In further explanation of the operation of the machine, it may be stated that the beet-carrying runs of the two conveyers receive the beets at their lower extremities, with the tops uppermost and the beets are carried upwardly without changing their position. In other words, the beets as they travel with the conveyer-runs are extended lengthwise thereof with the tops uppermost, so that during the operation of the machine there is a row of beets within the two runs of the conveyers constantly moving upwardly, the beets being discharged at the upper extremity of the lower run. By virtue of this arrangement, whereby the beets are held in a uniform position and with their tops uppermost, the work of topping the beets as they leave the conveyer runs is greatly facilitated and it becomes practicable to arrange a mechanical topper, not shown, at this point which shall properly remove the tops as they are discharged by the conveyers and before they are allowed to enter the tiltable trough 57. As the beets pass between the coöperating beet-carrying conveyer-runs, at their lower extremities, the upper conveyer swings upwardly at this point in order to allow the beets to enter the traveling chute or chamber formed by the two conveyer-runs. This movement is due to the fact that the idlers 24 prevent the chains from yielding at this point, except by the movement of the conveyer 20 on its center of oscillation, namely, the axis of the shaft 17. It thus results that when the beets have entered the conveyer they are trapped therein, the runs of the conveyer being arranged to grip the beets with sufficient firmness to keep them constantly moving during the operation of the machine. During the upward travel of the beets, the beet-carrying conveyer-runs are in a constant state of vibration, whereby all of the dirt is shaken from the beets and drops downwardly between the chain-connecting slats 32 of the upper run of the lower conveyer, the said slats being sufficiently open for the purpose. In order to relieve the supporting strain from the link 53, when the main framework 5 is in the position shown in Fig. 2, that is to say, when the diggers are in the ground, a stop-collar B is adjustably mounted upon each shaft 45 of the caster wheels 43, the said collar being held in place by a set bolt H. This collar should be so adjusted that when the framework is in its normal position for beet-harvesting purposes, the framework will be supported by the collars B, thus entirely relieving the links 53 and their connections from the supporting strain to which they would otherwise be subjected, as aforesaid.

In view of the adjustability of the framework whereby it may be tilted, as heretofore explained, it is important that the tongue D of the machine shall be pivoted as shown at C to allow the framework to oscillate vertically without subjecting the necks of the horses drawing the machine to undue strain.

Having thus described my invention, what I claim is:

1. A beet harvester comprising two endless, traveling conveyers, an oscillatory frame upon which one of the conveyers is mounted, the said frame carrying a depending sprocket wheel interposed between the two runs of the conveyer and engaging the lower run thereof for holding the conveyer in operative relation with the other conveyer, and for maintaining a portion of the said conveyer in a position parallel with a row of beets, the two conveyers having coöperating beet-carrying runs, the oscillatory frame being adapted to adjust itself automatically to separate the conveyer runs to make room for beets of the larger size, substantially as described.

2. A beet harvester, comprising two endless, traveling conveyers, a frame upon which one of the conveyers is mounted, an idle sprocket wheel carried by the said frame, and interposed between the two runs of the conveyer and engaging the lower run thereof for holding the same in operative relation with one run of the other conveyer, the said frame being pivotally mounted at its rear extremity, while its forward extremity is free from engagement with the harvester to permit of a vertical oscillatory movement of the conveyer, whereby the space between the two conveyers is regulated for beets of various sizes, substantially as described.

3. The combination with a main frame, of two endless, traveling conveyers, having coöperating beet-carrying runs, a frame pivotally mounted on its rear extremity, while its forward extremity is free to oscillate vertically, the said frame carrying one of the conveyers, a depending sprocket wheel mounted on the said frame and interposed between the runs of the conveyer near its free extremity and under which the lower run of the conveyer passes, whereby a portion of the said conveyer, mounted on the oscillatory frame, is held in a position parallel with the row of beets, the said parallel portion of the conveyer being adapted to engage the tops of the beets and carry them rearwardly between the conveyers, substantially as described.

4. In a machine of the class described, the combination with a traveling conveyer having coöperating, beet-carrying runs, a frame upon which one of the conveyers is mounted, at its rear extremity, while its forward extremity is free to oscillate vertically, a depending sprocket wheel mounted on the said frame, and interposed between the runs of the conveyer, near the forward extremity thereof, the lower run of the said conveyer passing under the said sprocket wheel, whereby a portion of the conveyer is maintained in a horizontal position, whereby the horizontal portion of the chain is adapted to engage the tops of the beets for carrying them rearwardly between the conveyers, the conveyers having chains connected by slats bowed between the chains to form a space, substantially elliptical in cross-section, substantially as described.

5. The combination with a main frame, of an endless, traveling conveyer having co-operating, beet-carrying runs, an oscillatory frame carrying one of the conveyers, an idle sprocket wheel carried by the said frame and engaging the lower run of the conveyer near its forward extremity for holding the said conveyer in operative relation with the other conveyer.

In testimony whereof I affix my signature in presence of two witnesses.

GEORGE C. GETTMAN.

Witnesses:
A. J. O'BRIEN,
JESSIE F. HOBART.

Copies of this patent may be obtained for five cents each, by addressing the "Commissioner of Patents, Washington, D. C."